(12) United States Patent
Kim et al.

(10) Patent No.: US 10,313,090 B2
(45) Date of Patent: Jun. 4, 2019

(54) TONE MAPPING SIGNALING IN A PREAMBLE

(71) Applicant: Apple Inc., Cupertino, CA (US)

(72) Inventors: Joonsuk Kim, Saratoga, CA (US); Guoqing Li, Cupertino, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 15/133,952

(22) Filed: Apr. 20, 2016

(65) Prior Publication Data
US 2016/0309473 A1    Oct. 20, 2016

Related U.S. Application Data

(60) Provisional application No. 62/150,105, filed on Apr. 20, 2015.

(51) Int. Cl.
*H04J 3/16* (2006.01)
*H04L 5/00* (2006.01)
*H04L 27/26* (2006.01)

(52) U.S. Cl.
CPC ........ *H04L 5/0094* (2013.01); *H04L 27/2613* (2013.01); *H04L 27/2647* (2013.01); *H04L 5/0007* (2013.01)

(58) Field of Classification Search
CPC ... H04L 5/0007; H04L 5/0046; H04L 5/0091; H04L 5/0044; H04W 72/042; H04W 72/0446; H04W 52/34; H04W 52/48; H04W 5/0094
See application file for complete search history.

(56) References Cited

U.S. PATENT DOCUMENTS

| | | | |
|---|---|---|---|
| 8,428,606 B1 | 4/2013 | Vrzic et al. | |
| 8,767,374 B2 * | 7/2014 | Masuda | H01G 4/06 361/301.4 |
| 8,767,637 B2 * | 7/2014 | Novak | H04L 5/0044 370/208 |
| 9,455,810 B2 * | 9/2016 | Chen | H04L 5/0046 |
| 9,716,579 B2 * | 7/2017 | Azizi | H04W 28/20 |
| 9,755,795 B2 * | 9/2017 | Aboul-Magd | H04L 5/0007 |
| 2016/0073392 A1 | 3/2016 | Byun et al. | |
| 2016/0330718 A1 * | 11/2016 | Kim | H04L 5/0091 |
| 2017/0339701 A1 | 11/2017 | Choi et al. | |

* cited by examiner

*Primary Examiner* — Hanh N Nguyen
(74) *Attorney, Agent, or Firm* — Sterne, Kessler, Goldstein & Fox, PLLC

(57) ABSTRACT

Disclosed herein are system, method, and computer program product embodiments for providing an efficient way to signal a tone mapping in a wireless communication protocol. Embodiments operate by receiving a frame for a wireless communications protocol. The embodiments extract a unique value from a tone mapping field in a preamble of the frame. The embodiments look up a resource block allocation for a portion of the tone space in a lookup table using the unique value. The embodiments map the tones of the portion of the tone space to one or more resource blocks based at least in part on the determined resource block allocation.

25 Claims, 5 Drawing Sheets

TONE MAPPING SIGNALING IN A PREAMBLE

BACKGROUND

Technical Field

The disclosed embodiments relate to the field of wireless communications, including to tone mapping in wireless communications.

Background

Many wireless communication protocols modulate data using a multicarrier modulation scheme. For example, Orthogonal Frequency Division Multiple Access (OFDMA) is a common multicarrier modulation scheme. In a multicarrier modulation scheme, a wireless channel is divided into multiple tones. Each tone occupies a portion of the wireless channel bandwidth. During a transmission, data is carried over the multiple tones in parallel.

In order to schedule a transmission, a plurality of tones is grouped into resource blocks. Each resource block may contain a standard number of tones and is assigned to a specific receiver device.

In order to receive a transmission, a receiver device needs to know how the tones are mapped to the resource blocks. This tone mapping may be specified in a preamble field of a wireless frame. However, because there may be a large number of possible tone mapping combinations, the preamble field may be of large size. But the transmission of a preamble of large size may increase power consumption which may reduce battery life in a portable device. Moreover, additional compute processing may be necessary to decode a preamble of large size. This may also increase power consumption.

SUMMARY

According to some embodiments, a signaling mechanism is utilized to efficiently map tones to resource blocks in a wireless communications protocol, e.g., a proposal for the Institute of Electrical and Electronics Engineers (IEEE) 802.11ax standard.

In some embodiments, a receiving device receives a frame for a wireless communications protocol. The receiving device extracts a unique value from a tone mapping field stored in a preamble of the frame. The tone mapping field includes the unique value that indicates a resource block allocation combination. The receiving device looks up a resource block allocation in a lookup table using the unique value. After retrieving the associated resource block allocation from the lookup table, the receiving device maps tones from a portion of the tone space for the wireless communications protocol to resource blocks. Thereafter, the receiving device processes the data carried over the tones assigned to its resource block.

In some embodiments, the number of tones for the wireless communications protocol is based at least in part on a 20 MHz channel. In some embodiments, when the receiving device extracts a unique value from the tone mapping field, it looks up the resource block allocation for the 20 MHz channel.

In other embodiments, the number of tones for the wireless communications protocol is based at least in part on an 80 MHz channel. In some embodiments, the number of tones is divided up into a plurality of portions. For example, a portion of the plurality of portions may be a band of 20 MHz.

In some embodiments, a unique value stored in the tone mapping field indicates a resource block allocation combination for a portion of the plurality of portions. When the receiving device extracts a unique value from the tone mapping field, it looks up the resource block allocation for an associated portion of the tone space. Because a unique value of the tone mapping field is associated with a portion of the tone space, a size of the tone mapping field can be based at least in part on a size of the portion of the tone space. For example, a size of a portion of the tone space may be a size of a band of 20 MHz instead of a channel of 80 MHz.

Other features of the present disclosure will be apparent from the accompanying drawings and from the detailed description, which follows.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an efficient way to signal a tone mapping in a wireless communication protocol. Embodiments operate by receiving a frame for a wireless communications protocol. The embodiments extract a unique value from a tone mapping field in a preamble of the frame. The embodiments look up a resource block allocation for a portion of the tone space in a lookup table using the unique value. Embodiments map the tones of the portion of the tone space to one or more resource blocks based at least in part on the determined resource block allocation. Because the tone mapping field is associated with a portion of the tone space, and the size of the unique value is based at least in part on the size of the portion of the tone space, the size of the preamble can be kept relatively small which facilitates efficient tone mapping signaling.

Figure 1:
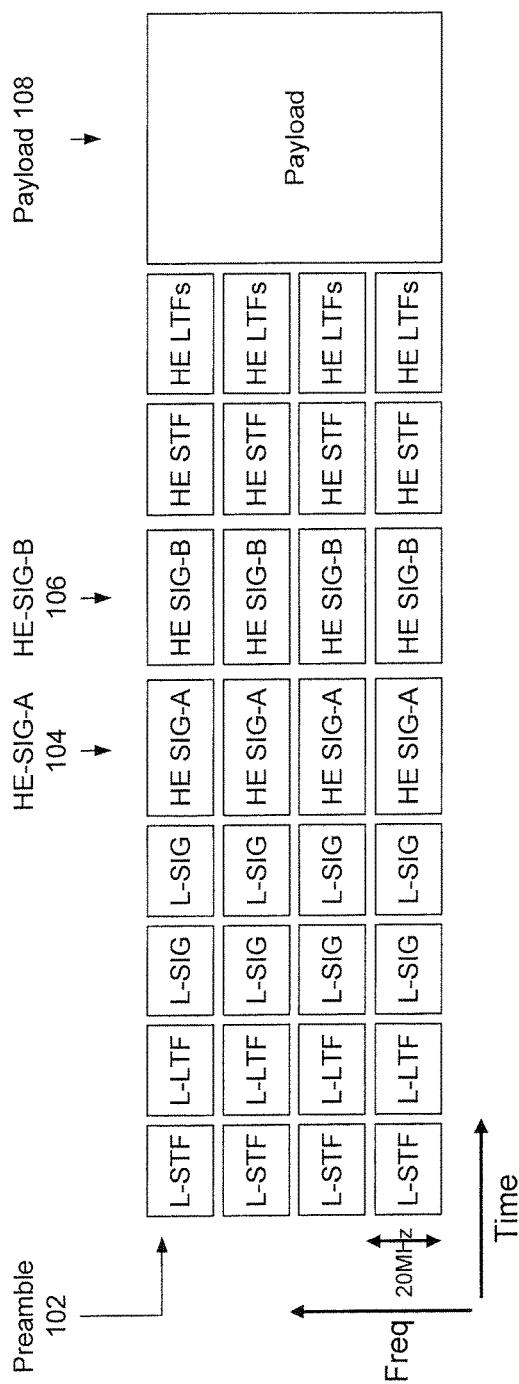
FIG. 1 is a block diagram of an example frame that provides tone mapping signaling for a wireless local area network (WLAN), according to example embodiments.

FIG. 1 is a block diagram of a frame 100 that provides a frame structure for a wireless local area network (WLAN), according to example embodiments. For example, in embodiments, a WLAN may use a proposal for the IEEE 802.11 ax standard or various other wireless communication protocols. In embodiments, frame 100 may be transmitted according to an Orthogonal Frequency Division Multiple Access (OFDMA) multicarrier modulation scheme or various other modulation schemes. However, a person of ordinary skill in the art would appreciate that this tone mapping signaling technique may be used with other wireless communication protocols and modulation schemes.

In some embodiments, frame 100 includes a preamble 102 and a payload 108. Preamble 102 may be a preamble for use with a proposal for the IEEE 802.11 ax standard. However, a person of ordinary skill in the art would appreciate that this tone mapping technique may be applied to a preamble for another wireless communication protocol. In some embodiments, payload 108 represents actual data carried within frame 100 over a wireless local area network.

In FIG. 1, frame 100 is transmitted over an 80 MHz channel. The 80 MHz channel is divided into four 20 MHz bands. The fields of preamble 102 are transmitted over each 20 MHz band of the 80 MHz channel. As would be appreciated by a person of ordinary skill in the art, in some implementations, the fields of preamble 102 may be transmitted simultaneously over four 20 MHz bands of the 80 MHz channel.

As would be appreciated by a person of ordinary skill in the art, frame 100 may be transmitted over different size bands for different size channels. For example, in some embodiments, the fields of preamble 102 may be transmitted once over a single 20 MHz band of a 20 MHz channel. In some other embodiments, the fields of preamble 102 may be duplicated over two 20 MHz bands of a 40 MHz channel.

In some embodiments, a channel may have a plurality of tones, where the plurality of tones may be used to carry data. The number of tones of a channel may be referred to as a "tone space." In some embodiments, the number of tones can be based on the size of the channel. For example, in FIG. 1, there may be up to 996 tones in the 80 MHz channel.

In some embodiments, in order to schedule transmissions to different receiver devices, tones are grouped into resource blocks and each resource block is assigned to a different receiver device. In some embodiments, a resource block may have different tone allocation sizes. For example, a resource block may include 26 tones, 52 tones, or a to-be-determined (TBD) number of tones.

In some embodiments, different resource blocks may contain different numbers of tones. Thus, while there are a finite number of mappings of tones to resource blocks in the tone space, the number of mappings may be very large.

A tone mapping needs to be signaled to a receiver device before payload processing. Otherwise, the receiver device will not know which resource block to process. Given that the number of mapping combinations of resource blocks is large, storing the tone mapping for the entire tone space in a preamble field may require a large number of bits for the field. The transmission of a preamble of large size may increase power consumption, which in turn may reduce battery life in a portable device. Moreover, additional compute processing may be necessary to decode a preamble of larger size. This may also increase power consumption.

In some embodiments, these technological issues are resolved by indicating the tone mapping for a portion of the tone space using a lookup table. For example, the tone mapping may be performed for each 20 MHz band, instead of for an entire 80 MHz channel, using a lookup table.

In FIG. 1, preamble 102 includes several data fields. For example, in some embodiments, preamble 102 includes a High-Efficiency-Signal-A (HE-SIG-A) 104 field and a High-Efficiency-Signal-B (HE-SIG-B) 106 field. In addition, preamble 102 may include other fields specified in a proposal for the IEEE 802.11 ax standard such as, for example, L-STF, L-LTF, L-SIG, HE STF, and HE LTFs fields.

In some embodiments, the HE-SIG-A 104 field includes common information that is provided to all receiver devices. Consequently, in FIG. 1, the HE-SIG-A 104 field is duplicated over the four 20 MHz bands of the 80 MHz channel.

In some embodiments, the HE-SIG-A 104 field may include 24 bits of information. In addition, the HE-SIG-A 104 field may include several subfields within the 24 bits of information. Specifically, the HE-SIG-A 104 field may include a BW subfield that indicates the channel bandwidth and a reserved subfield that indicates whether the frame is an OFDMA frame. For example, a BW subfield would indicate that the channel bandwidth is 80 MHz and the reserved field would be set to indicate an ODFMA frame.

In some embodiments, the HE-SIG-B 106 field includes user specific information. Consequently, in FIG. 1, the HE-SIG-B 106 field may be different over the four 20 MHz bands of the 80 MHz channel. This is because there may be different tone mappings for different receiver devices, e.g., resource block arrangements and assignments for users, in each 20 MHz band.

In some embodiments, the HE-SIG-B 106 field may include several fields of per user information. Specifically, the HE-SIG-B 106 may include user specific information subfields and a tone mapping field. In some embodiments, the user specific information subfields may indicate which resource block belongs to which user device, e.g. using a user identifier, a coded media access control, or a MAC address.

In some embodiments, because the HE-SIG-B 106 is transmitted for each band of the channel, the tone mapping field need only indicate the tone mapping for its respective band and not across the entire bandwidth. As result, the size of the tone mapping field may be reduced.

In some embodiments, the size of the tone mapping field can be further reduced by representing the tone mapping for a band using a unique value assigned for each tone mapping combination. In some embodiments, the tone mapping field may be sized according to the number of different resource block allocations possible in a given band. Moreover, a given resource block allocation may be represented as a unique value in the tone mapping field. Thus, in some embodiments, a receiver device may determine the current tone mapping for a given band by extracting the unique value from the tone mapping field and by looking up the corresponding tone mapping in a lookup table using the unique value. As would be appreciated by a person of ordinary skill in the art, the actual tone mapping may be encoded in the lookup table in various ways. Moreover, as would be appreciated by a person of ordinary skill in the art, the lookup table may be implemented as a hash table, array, linked list, or various other data structures.

For example, in FIG. 1, the size of the tone mapping field can be based on the number of different resource block allocation combinations in a given 20 MHz band. Thus, because there are 25 possible different resource block allocation combinations per band in FIG. 1, the tone mapping field may be represented as five bits, e.g., $2^5=32$ combinations.

Figure 2:
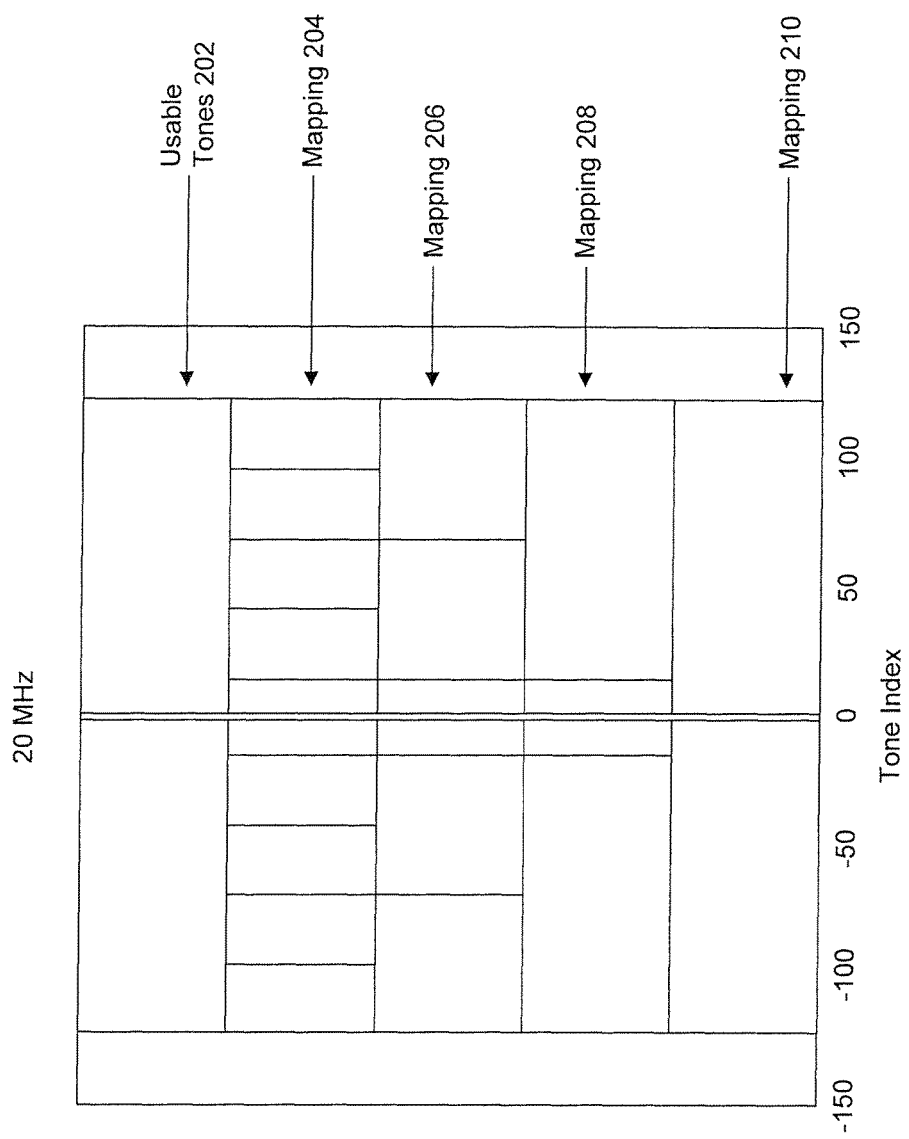
FIG. 2 is a block diagram of possible tone mappings for a WLAN, according to example embodiments.

FIG. 2 is a block diagram of possible tone mappings for a wireless local area network (WLAN), according to example embodiments. For example, in embodiments, a WLAN may use a proposal for the IEEE 802.11 ax standard or various other wireless communication protocols. However, a person of ordinary skill in the art would appreciate that this tone mapping signaling technique also may be used with other wireless communication protocols and modulation schemes. In FIG. 2, examples of the possible tone mappings for a 20 MHz channel are shown.

In FIG. 2, usable tones 202 represent the total number of tones present in the 20 MHz band, according to some embodiments. For example, in some embodiments, usable tones 202 may represent 256 total tones of which 242 are available for data transmission.

In FIG. 2, the 20 MHz band may be divided into, e.g., a maximum 9 resource blocks containing 26 data tones each. In other words, in some embodiments, up to nine receivers may be assigned to the 20 MHz band. This tone mapping is represented as mapping 204.

In FIG. 2, in other embodiments, the 20 MHz band may be divided into 4 resource blocks of 52 data tones each and 1 resource block of 26 data tones. This tone mapping is represented as mapping 206. In other embodiments, the 20 MHz band may be divided into 2 resource blocks of TBD number of data tones each and a resource block of 26 data tones. This tone mapping is represented as mapping 208. Finally, in another example, 242 data tones of the 20 MHz band may be assigned to one resource block. This tone mapping is represented as mapping 210.

In some embodiments, because the tone mapping field of HE-SIG-B is associated with a specific 20 MHz band, the size of the tone mapping field need only be large enough to represent all resource block allocations for that 20 MHz band. Thus, with resource blocks of 26, 52, TBD, and 242 tone sizes, there are at most 25 resource block allocations. Thus, the tone mapping field size should be at least five bits to permit identifying those 25 resource block allocations, as $2^5=32$ combinations.

With respect to the 25 resource block allocations illustrated by FIG. 2, there is one case in which there 9 resource blocks of 26 tones each. There are 4 cases in which there is 1 resource block of 52 tones and 7 resource blocks of 26 tones each. There are 6 cases in which there are 2 resource blocks of 52 tones each and 5 resource blocks of 26 tones each. There are 4 cases in which there are 3 resource blocks of 52 tones each and 3 resource blocks of 26 tones each. There are 8 cases in which there is 1 resource block of TBD number of tones and other resource block combinations. There is 1 case in which the whole 20 MHz band is allocated to a single resource block. Finally, there is one case for aggregating adjacent 20 MHz bands for 40 MHz allocation.

Figure 3:
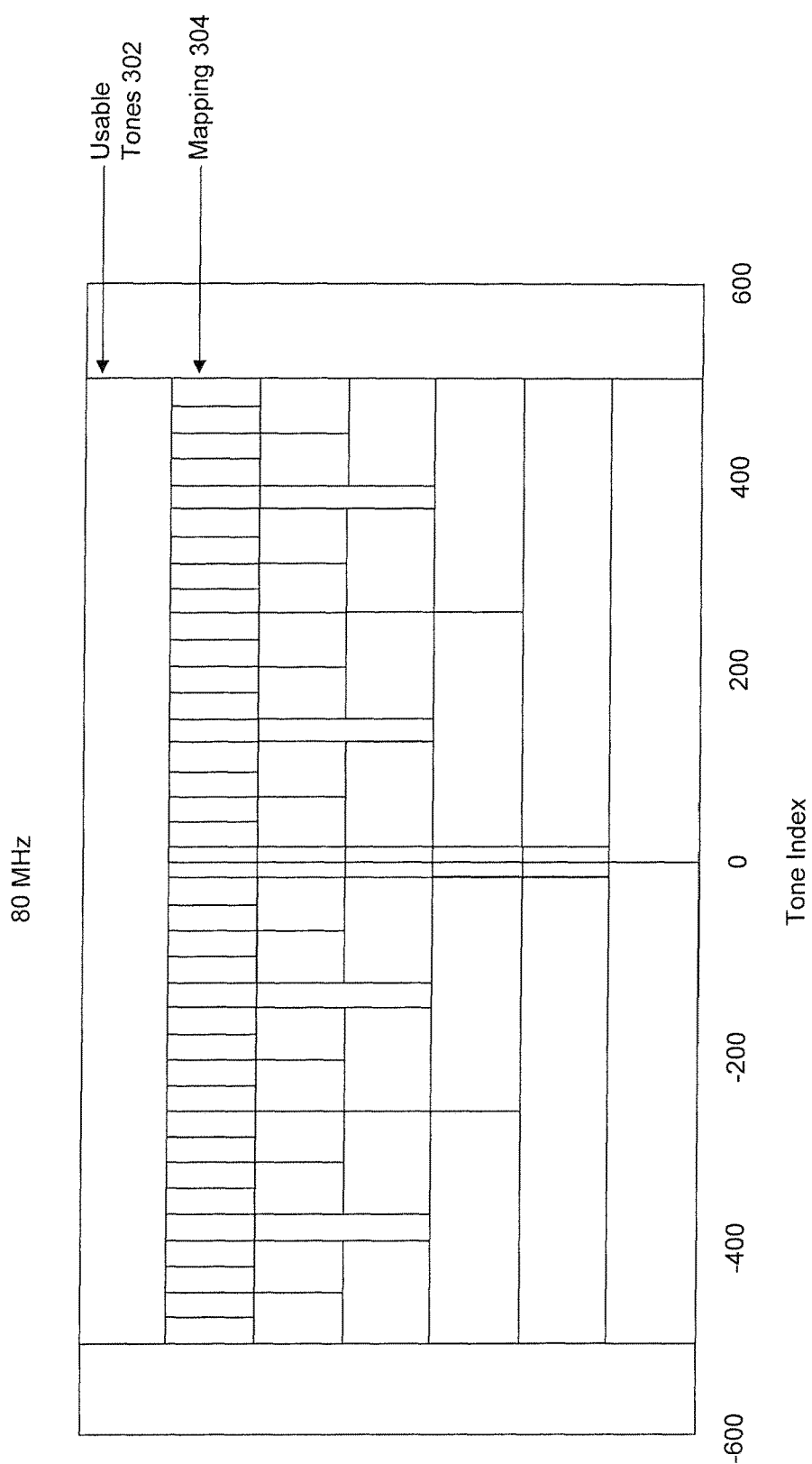
FIG. 3 is a block diagram of possible tone mappings for a WLAN, according to example embodiments.

FIG. 3 is a block diagram of possible tone mappings with 80 MHz bandwidth OFDMA for a wireless local area network (WLAN), according to example embodiments. For example, in some embodiments, a WLAN may use a proposal for the IEEE 802.11 ax standard or various other wireless communication protocols. However, a person of ordinary skill in the art would appreciate that this tone mapping signaling technique also may be used with other wireless communication protocols and modulation schemes.

In FIG. 3, the possible tone mappings for an 80 MHz channel are shown. For example, in FIG. 3, the 20 MHz band of FIG. 2 is repeated four times because the channel is 80 MHz. In FIG. 3, there are at most 996 tones as shown by usable tones 302 and there may be up to 37 resource blocks that may be assigned to 37 different receiver devices. Because FIG. 3 can be represented as multiple 20 MHz bands, the tone mapping field size may remain, e.g., 5 bits, where 5 bits in each 20 MHz band would represent the tone mapping combination for the corresponding band. The bits showing the tone mapping combination, e.g., the 5 bits, may have different values per 20 MHz band. In some embodiments, these 5 bits may be stored in a tone mapping field of an HE-SIG-B field.

Figure 4:
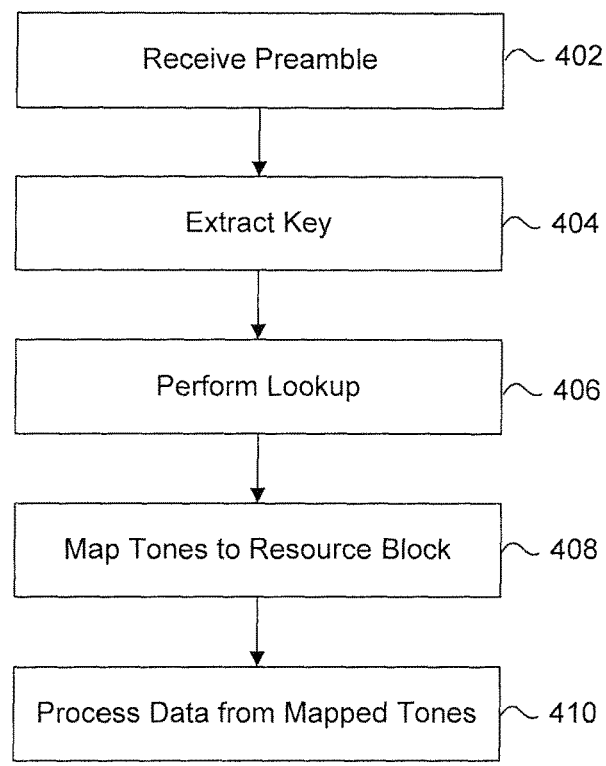
FIG. 4 is a flowchart illustrating an example of performing tone mapping signaling, according to example embodiments.

FIG. 4 is a flowchart for an example method 400 for tone mapping signaling, according to some embodiments. Method 400 can be performed by processing logic that can include hardware (e.g., circuitry, dedicated logic, programmable logic, microcode, etc.), software (e.g., instructions executing on a processing device), or a combination thereof.

In 402, a receiving device receives a preamble of a frame for a wireless communications protocol. The preamble includes a tone mapping field. In some embodiments, the tone mapping field may be stored in an HE-SIG-B field, e.g., according to a proposal for the IEEE 802.11 ax standard. The tone mapping field may be associated with a given portion of a tone space. For example, in some embodiments, the tone space may be based on an 80 MHz channel, the tone mapping field may be, e.g., 5 bits in size, and the portion of the tone space may be associated with a 20 MHz band of the channel. As would be appreciated by a person of ordinary skill in the art, other combinations are possible for the tone space.

In 404, the receiving device extracts a unique value from the tone mapping field.

In 406, the receiving device uses the extracted unique value to lookup the corresponding tone mapping in a lookup table. As would be appreciated by a person of ordinary skill in the art, the actual tone mapping may be encoded in the lookup table in various ways. Moreover, as would be appreciated by a person of ordinary skill in the art, the lookup table may be implemented as a hash table, array, linked list, or various other data structures.

In 408, the receiving device maps the tones in the given portion of the tone space to a resource block associated with the receiving device, based on the determined tone mapping of 406.

In 410, the receiving device processes data associated with its assigned resource block.

Figure 5:
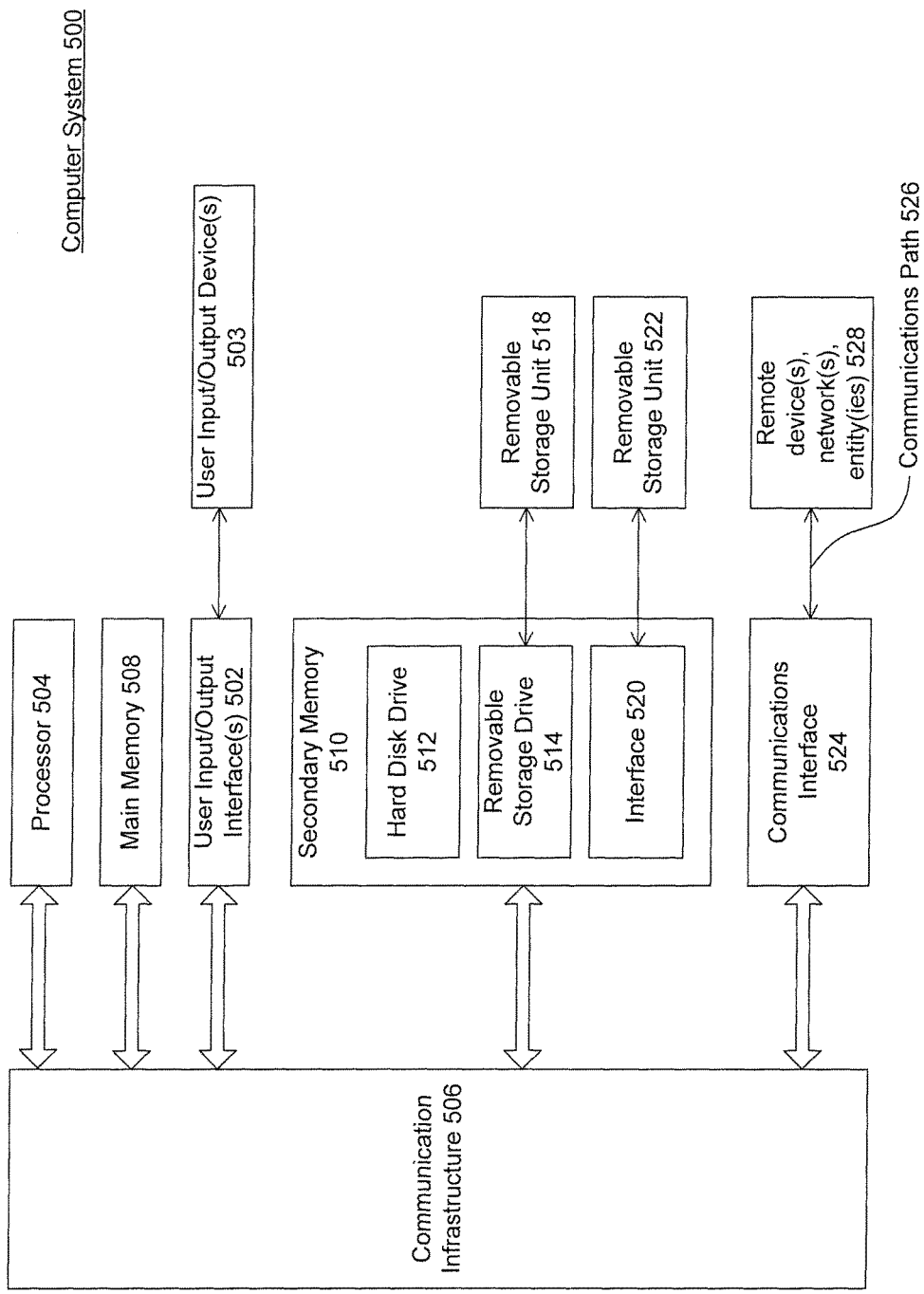
FIG. 5 is an example computer system for implementing various embodiments.

Various embodiments can be implemented, for example, using one or more computer systems, such as computer system 500 shown in FIG. 5. Computer system 500 can be used, for example, to implement method 400 of FIG. 4. For example, computer system 500 can determine a resource block allocation of a portion of a tone space using a lookup table. Computer system 500 can further map a plurality of tones to a resource block based on the determined resource block allocation, according to some embodiments. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to embodiments, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In embodiments, a tangible apparatus or article of manufacture including a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for performing tone mapping for a wireless communications protocol, comprising:
   receiving, by at least one processor, a preamble of a frame corresponding to the wireless communications protocol, wherein the preamble comprises a tone mapping field;
   extracting, by the least one processor, a unique value from the tone mapping field, wherein a bit size of the tone mapping field is based at least in part on a plurality of potential resource block mappings for a portion of a tone space corresponding to the wireless communications protocol;
   determining, by the least one processor, a particular resource block mapping among the plurality of potential resource block mappings for the portion of the tone space using a lookup table based at least in part on the unique value, wherein the particular resource block mapping defines a different number of resource blocks allocated to the portion of the tone space than another resource block mapping in the plurality of potential resource block mappings; and
   mapping, by the least one processor, a plurality of tones to a resource block in the portion of the tone space based at least in part on the particular resource block mapping.

2. The method of claim 1, further comprising:
assigning, by the least one processor, the resource block to a receiver device based at least in part on the frame corresponding to the wireless communications protocol.

3. The method of claim 1, wherein the wireless communications protocol uses an orthogonal frequency division multiple access (OFDMA) modulation scheme and the tone mapping field is stored in a high-efficiency-signal-B (HE-SIG-B) field of the preamble.

4. The method of claim 1, wherein the bit size of the tone mapping field is 5 bits.

5. The method of claim 1, wherein the size of the portion of the tone space corresponds to a 20 MHz band.

6. The method of claim 1, wherein the tone space of the wireless communications protocol is divided into a plurality of portions.

7. The method of claim 6, wherein a resource block mapping of a first portion of the plurality of portions is different than a resource block mapping of a second portion of the plurality of portions.

8. The method of claim 6, wherein each portion of the plurality of portions of the tone space corresponds to a respective tone space field in the preamble of the frame.

9. The method of claim 1, wherein the tone mapping field corresponds to the portion of the tone space, and the size of the portion of the tone space is less than an entire bandwidth of the wireless communication protocol.

10. The method of claim 1, further comprising:
determining, by the at least one processor, a size of the resource block in the portion of the tone space using the lookup table based at least in part on the unique value.

11. The method of claim 1, wherein the particular resource block mapping defines 26 or 52 tones for a resource block in the number of resource blocks allocated to the portion of the tone space.

12. The method of claim 1, wherein the particular resource block mapping is unique among the plurality of potential resource block mappings for the portion of the tone space.

13. A system, comprising:
a memory; and
at least one processor coupled to the memory and configured to:
receive a preamble of a frame corresponding to a wireless communications protocol, wherein the preamble comprises a tone mapping field;
extract a unique value from the tone mapping field, wherein a bit size of the tone mapping field is based at least in part on a plurality of potential resource block mappings for a portion of a tone space corresponding to the wireless communications protocol; and
determine a particular resource block mapping among the plurality of potential resource block mappings for the portion of the tone space based at least in part on the unique value, wherein the particular resource block mapping defines a different number of resource blocks allocated to the portion of the tone space than another resource block mapping in the plurality of potential resource block mappings.

14. The system of claim 13, wherein the at least one processor is further configured to:
map a plurality of tones to a resource block in the portion of the tone space based at least in part on the particular resource block mapping.

15. The system of claim 13, wherein the at least one processor is further configured to:
assign the resource block to a receiver device based at least in part on the frame corresponding to the wireless communications protocol.

16. The system of claim 13, wherein the wireless communications protocol uses an orthogonal frequency division multiple access (OFDMA) modulation scheme and the tone mapping field is stored in a high-efficiency-signal-B (HE-SIG-B) field of the preamble.

17. The system of claim 13, wherein the bit size of the tone mapping field is 5 bits and the size of the portion of the tone space corresponds to a 20 MHz band.

18. The system of claim 13, wherein the tone space of the wireless communications protocol is divided into a plurality of portions.

19. The system of claim 18, wherein a resource block mapping of a first portion of the plurality of portions is different than a resource block mapping of a second portion of the plurality of portions.

20. A tangible computer-readable device having instructions stored thereon that, when executed by at least one computing device, cause the at least one computing device to perform operations comprising:
receiving a preamble of a frame corresponding to a wireless communications protocol, wherein the preamble comprises a tone mapping field;
extracting a unique value from the tone mapping field, wherein a bit size of the tone mapping field is based at least in part on a plurality of potential resource block mappings for a portion of a tone space corresponding to the wireless communications protocol;
determining a particular resource block mapping among the plurality of potential resource block mappings for the portion of the tone space based at least in part on the unique value, wherein the particular resource block mapping defines a different number of resource blocks allocated to the portion of the tone space than another resource block mapping in the plurality of potential resource block mappings;
mapping, by the least one processor, a plurality of tones to a resource block in the portion of the tone space based at least in part on the particular resource block mapping; and
assigning the resource block to a receiver device based at least in part on the frame corresponding to the wireless communications protocol.

21. The computer-readable device of claim 20, wherein the wireless communications protocol uses an orthogonal frequency division multiple access (OFDMA) modulation scheme and the tone mapping field is stored in a high-efficiency-signal-B (HE-SIG-B) field of the preamble.

22. The computer-readable device of claim 20, wherein the bit size of the tone mapping field is 5 bits and the size of the portion of the tone space corresponds to a 20 MHz band.

23. The computer-readable device of claim 20, wherein the tone space of the wireless communications protocol is divided into a plurality of portions.

24. The computer-readable device of claim 23, wherein a resource block mapping of a first portion of the plurality of portions is different than a resource block mapping of a second portion of the plurality of portions.

25. The computer-readable device of claim 20, wherein the portion of the tone space comprises fewer than 10 resource blocks.

* * * * *

UNITED STATES PATENT AND TRADEMARK OFFICE
CERTIFICATE OF CORRECTION

PATENT NO. : 10,313,090 B2
APPLICATION NO. : 15/133952
DATED : June 4, 2019
INVENTOR(S) : Kim et al.

Page 1 of 1

It is certified that error appears in the above-identified patent and that said Letters Patent is hereby corrected as shown below:

In the Claims

Claim 2, Column 9, Line 2, "by the least one" should read --by the at least one--; and Claim 20, Column 10, Line 40, "by the least one" should read --by the at least one--.

Signed and Sealed this
Fifth Day of May, 2020

Andrei Iancu
*Director of the United States Patent and Trademark Office*